(12) United States Patent
Vladan et al.

(10) Patent No.: US 10,243,407 B2
(45) Date of Patent: Mar. 26, 2019

(54) SYSTEM, DEVICE, AND METHOD FOR CONTROLLING A POWER INVERTER

(71) Applicant: AVAGO TECHNOLOGIES INTERNATIONAL SALES PTE, LIMITED, Singapore (SG)

(72) Inventors: Marius Ionel Vladan, Eine (BE); Steve Hoste, Scheldewindeke (BE); Jean-Francois Koleck, Gavere (BE)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 166 days.

(21) Appl. No.: 15/338,566

(22) Filed: Oct. 31, 2016

(65) Prior Publication Data
US 2018/0097400 A1 Apr. 5, 2018

Related U.S. Application Data

(60) Provisional application No. 62/404,010, filed on Oct. 4, 2016.

(51) Int. Cl.
H02J 50/10 (2016.01)
H02J 50/12 (2016.01)

(52) U.S. Cl.
CPC ................................. H02J 50/12 (2016.02)

(58) Field of Classification Search
CPC ........................................ H02J 50/10
USPC ........................................... 307/104
See application file for complete search history.

(56) References Cited

U.S. PATENT DOCUMENTS

2013/0033118 A1* 2/2013 Karalis .................. H01F 38/14
307/104
2017/0117821 A1* 4/2017 Kato ...................... H02M 7/537

* cited by examiner

Primary Examiner — Joseph Chang
(74) Attorney, Agent, or Firm — Xsensus/Broadcom

(57) ABSTRACT

A wireless power transmitter includes circuitry configured to determine a reflected impedance from a receiver coil at a transmitter coil and control a dead-time of one or more switching stages of a power conversion device based on the reflected impedance. A tunable matching network at the transmitter is controlled based on the reflected impedance and the dead-time of the one or more switching stages.

20 Claims, 9 Drawing Sheets

SYSTEM, DEVICE, AND METHOD FOR CONTROLLING A POWER INVERTER

CROSS-REFERENCE TO RELATED PATENT APPLICATIONS

The present application claims the benefit of the earlier filing date of U.S. provisional application 62/404,010 having common inventorship with the present application and filed in the U.S. Patent and Trademark Office on Oct. 4, 2016, the entire contents of which being incorporated herein by reference.

TECHNICAL FIELD

The present disclosure is directed to a system, device, and method for controlling a DC-AC inverter.

BACKGROUND

Description of the Related Art

DC-AC power converters typically include high-side and low-side switches that are alternatingly cycled on and off to generate the oscillating waveforms for alternating current applications. As the switching frequency increases, switching losses also increase so a dead-time is built in to the switching time for the high-side switch and the low-side switch to allow time for the switching voltages to stabilize before. However, a dead-time between the switches that is too high causes a reduction in efficiency of the power converters.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
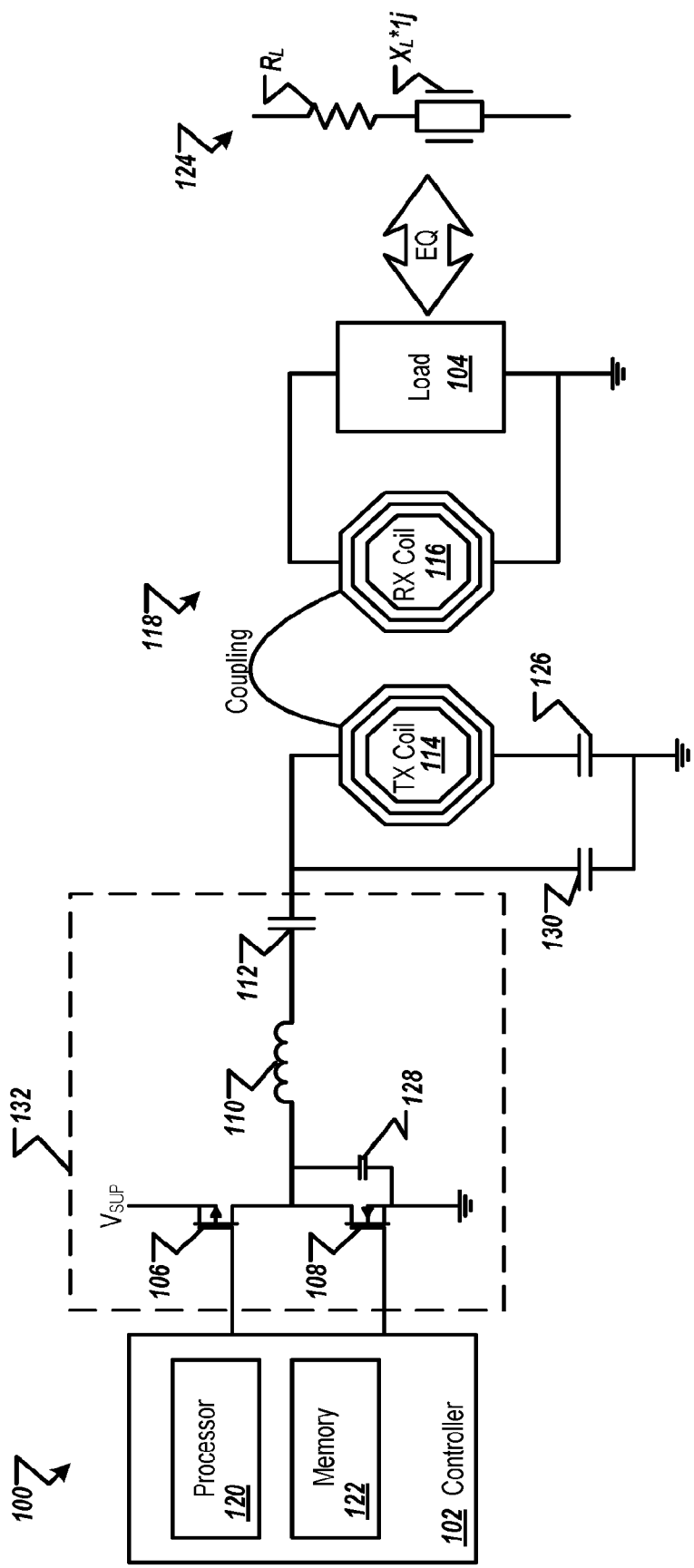
FIG. 1 is an exemplary diagram of a wireless power transmitter including a power converter.

In the drawings, like reference numerals designate identical or corresponding parts throughout the several views.

Further, as used herein, the words "a," "an" and the like generally carry a meaning of "one or more," unless stated otherwise.

In an exemplary implementation, a device includes circuitry configured to determine a load impedance for at least one power conversion device, control a dead-time of one or more switching stages of the at least one power conversion device based on the load impedance, and control a tunable matching network based on the load impedance and the dead-time of the one or more switching stages.

In another exemplary implementation, a process includes determining a reflected impedance from a receiver coil at a coil of a wireless power transmitter; controlling a dead-time of one or more switching stages of at least one power conversion device of the wireless power transmitter based on the reflected impedance; and controlling an impedance of a tunable matching network based on the reflected impedance and the dead-time of the one or more switching stages.

In another exemplary implementation, a wireless power transmitter includes circuitry configured to determine a reflected impedance from a receiver coil at a transmitter coil and control a dead-time of one or more switching stages of a power conversion device based on the reflected impedance. A tunable impedance of a matching network at the transmitter is controlled based on the reflected impedance and the dead-time of the one or more switching stages.

Aspects of the present disclosure are directed to a method and apparatus for controlling switch dead-time of a DC-AC inverter and a matching capacitance value of a wireless power transmitter in order to reduce power losses, provide inverter load matching, and minimize dead-time for switches of the inverter. A control circuit for the DC-AC inverter reduces currents in the substrate and significantly reduces the noise in the substrate that affects other substrate noise sensitive circuits, which allow an isolation ring area to be reduced. The control circuit also reduces currents flowing through external components thereby improving their reliability and improving efficiency at a system level. The control circuit also causes a decrease in a total cost of DC-AC inverter applications by removing a dependence on external fans or special heat sinkers since power losses can be reduced.

FIG. 1 is an exemplary diagram of a wireless power transmitter 100 including a half-bridge DC-AC power inverter 132 that includes a high-side switch 106 connected to a supply voltage $V_{SUP}$ and a low-side switch 108 connected to ground. Throughout the disclosure, the high-side switch 106 and the low-side switch 108 can be referred to together as a switching stage. The DC-AC power inverter 132 also includes an inductor 110 and capacitor 112 in series with a common connection point between the switches 106 and 108 and may include a capacitor 128 in parallel with the low-side switch 108 loading an inverter output node. In some implementations, the wireless power transmitter 100 is a Class-D wireless power transmission unit (PTU) that can be implemented in various wireless power transmission devices. For example, the wireless power transmitter 100 is included in a wireless charging device that wirelessly transmit power via transmit (TX) coil 114 that generates a magnetic flux applied across a receiver (RX) coil 116 in a wireless power receiver 118, thereby wirelessly inducing a voltage in the wireless power receiver 118. The wireless power transmitter 100 may also include a shunt capacitor 130 in parallel with the TX coil 114.

Power may be transmitted wirelessly from the wireless power transmitter 100 to the wireless power receiver 118 within or otherwise coupled to an electronic device, wherein the wireless power receiver may be used to provide power to hardware and/or circuitry within the electronic device, which is represented by load 104. An impedance of the load 104 is reflected back from the RX coil 116 to the TX coil 114, which is represented by equivalent reflected impedance 124, which includes a load resistance $R_L$ and load reactance $X_L*1j$.

The high-side switch 106 and the low-side switch 108 present a body diode resulting in a current through a substrate of the switches 106 and 108 and a parasitic capacitance that can result in losses during high frequency switching. The losses can be caused by current shoot-through of the switches 106 and 108, which results in excess heat and degradation in efficiency. In some implementations, a dead-time can be built in between the switches 106 and 108, which refers to a time when both of the switches 106 and 108 are turned off when switching between an ON state and an OFF-state. However, applying a fixed dead-time to the switches 106 and 108 can also reduce the efficiency of the DC-AC power inverter 132 because of changing load characteristics. For example, the dead-time may be based on an assumption that the reflected impedance 124 is capacitive so that an equivalent parallel LC circuit is formed and capacitive energy is not lost but transferred back and forth between the inductor and the parasitic capacitance. However, due to load variations, the impedance of the load 104 may not be constant, which makes maintaining an inductive load with a corresponding fixed dead-time that ensures a maximum efficiency difficult to achieve.

In some implementations, the wireless power transmitter 100 also includes a controller 102 for the DC-AC power inverter 132 that controls switching frequency, dead-time, and other operational parameters of the switches 106 and 108. The controller 102 includes a processor 120, memory 122, and other associated logic and circuitry for controlling the DC-AC power inverter 132. The memory 122 can store software instructions for one or more processes executed by circuitry of the processor 120, also referred to as processing circuitry. The controller 102 can also be implemented in hardware as a state machine with sequential and combinational logic. The controller 102 can also be configured to control a capacitance of a tunable matching capacitor 126 in series with the TX coil 114. By controlling both the dead-time between the switches 106 and 108 and the capacitance of the matching capacitor 126, the controller 102 can reduce losses and improve operational efficiency of the DC-AC power inverter 132. Details regarding the processes executed by the controller 102 to control the dead-time between the switches 106 and 108 and the capacitance of the matching capacitor 126 are discussed further herein.

Figure 2B:
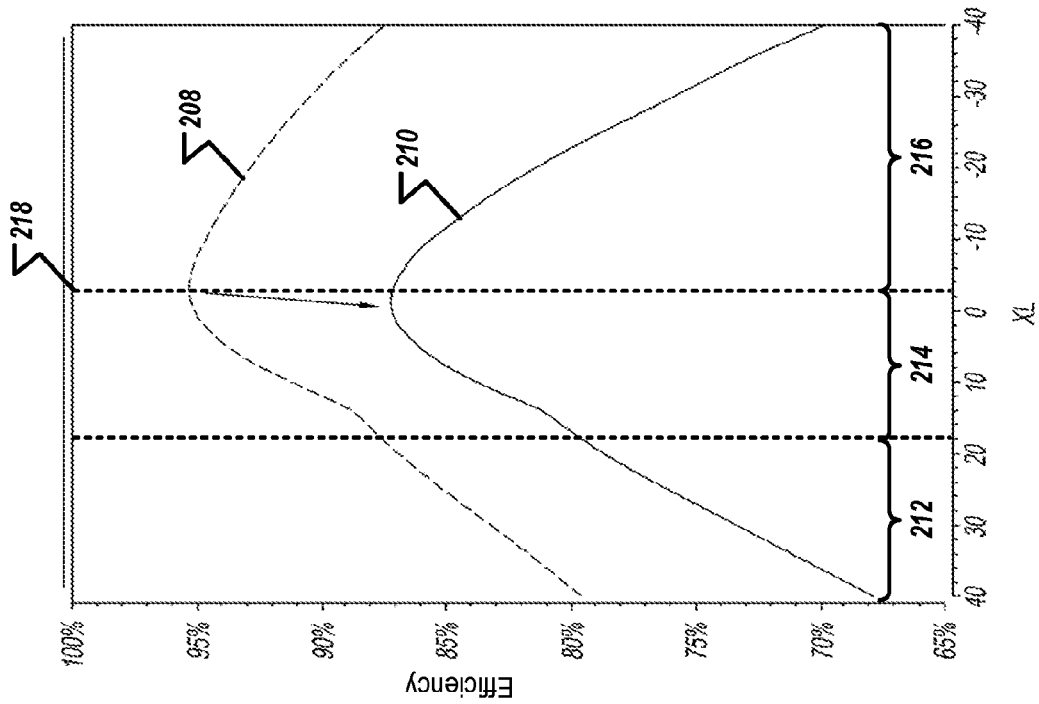
FIG. 2B illustrates exemplary graphs of efficiency with respect to load reactance for a power converter.
Figure 2A:
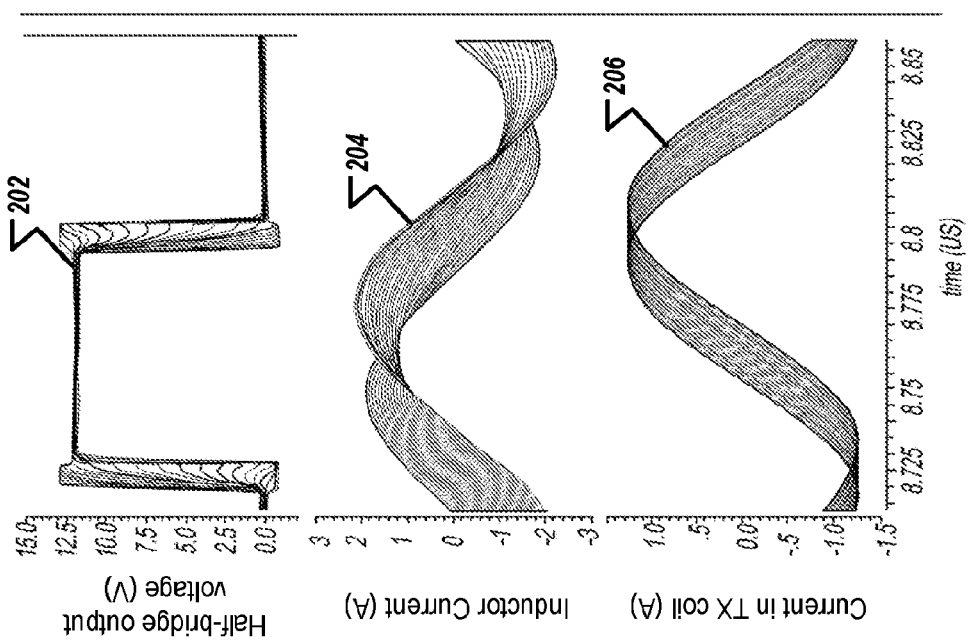
FIG. 2A illustrates exemplary graphs of voltage and current waveforms in a power converter.

FIGS. 2A and 2B include exemplary graphs illustrating operation of the wireless power transmitter 100. The graphs of FIG. 2A include waveform 202 of a half-bridge output voltage for the DC-AC inverter 132, waveform 204 of a current through the inductor 110, and waveform 206 of a current through the TX coil 114. The graphs of FIG. 2B include efficiency curve 208 that is based on no inductor losses, and efficiency curve 210 that includes effects of inductor losses. In region 212 of curves 208 and 210, capacitive half-bridge loading based on the impedance of the load 104 and rail-to-rail capacitive switching of the switches 106 and 108 due to the dead-time occur, which results in a reduced efficiency of the wireless power transmitter 100. In region 214 of curves 208 and 210, the efficiency is improved due to inductive half-bridge loading, but capacitive switching occurs, which results in lower efficiencies in sloped portions of the curves 208 and 210. In region 216 of the curves 208 and 210, both the half-bridge loading and the switching are inductive. When operating at a highest efficiency 218, a total load impedance of the wireless power transmitter 100 that includes both the capacitance of the tunable matching capacitor 126 and the reflected impedance 124 of the load 104 are capacitive. As will be in further detail herein, the controller 102 can control the capacitance of the matching capacitor 126 so that the total impedance corresponds to a predetermined operational efficiency range.

Figure 3:
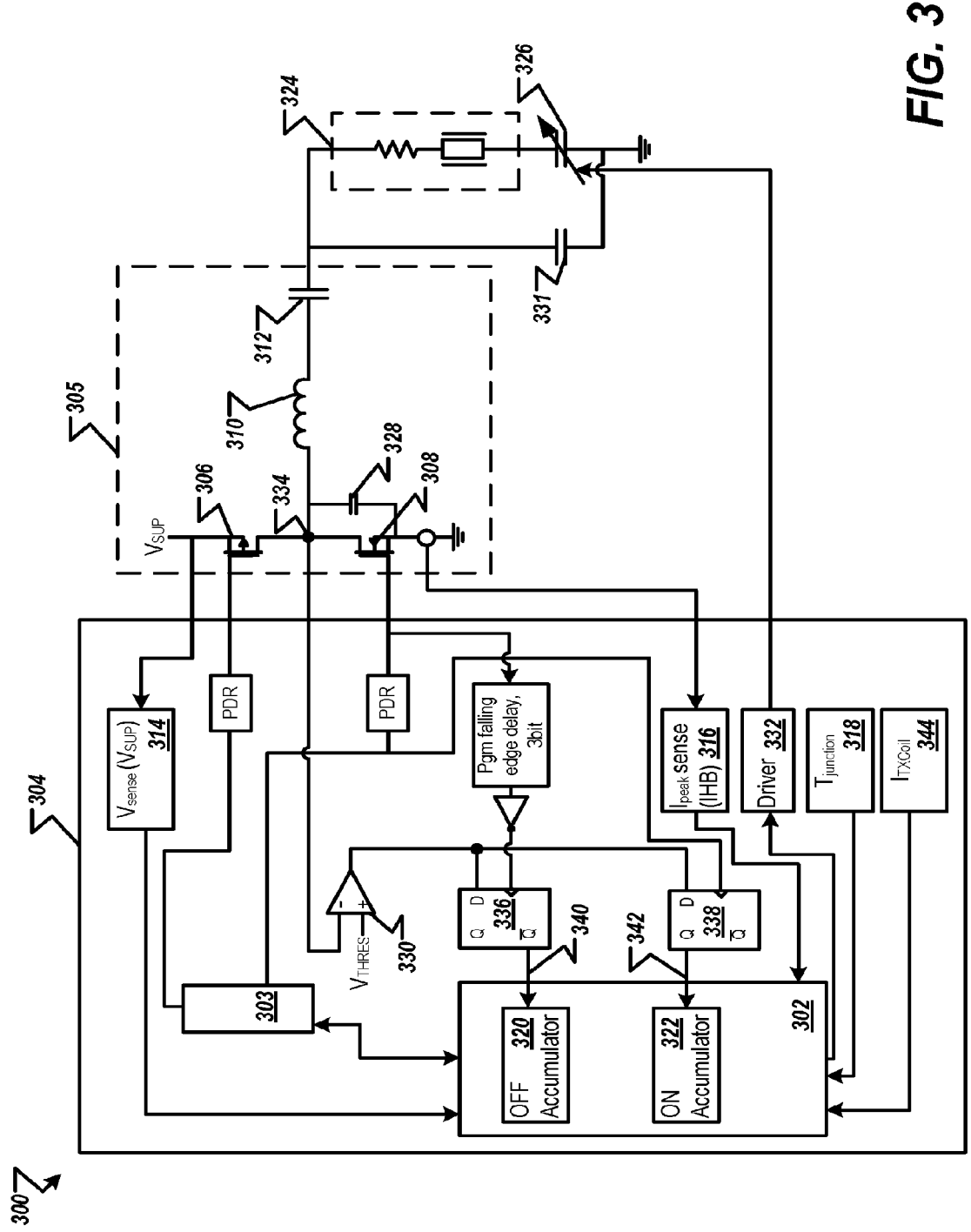
FIG. 3 is an exemplary schematic diagram of a controller for a power converter.

FIG. 3 is an exemplary schematic diagram of a wireless power transmitter 300 with a controller 304 for a DC-AC power inverter 305. The controller 304 is an implementation of the controller 102, and the DC-AC power inverter 305 is an implementation of the DC-AC power inverter 132 described previously herein (FIG. 1). For example, the DC-AC power inverter 305 includes a high-side switch 306 connected to a supply voltage $V_{SUP}$ and a low-side switch 308 connected to ground. The DC-AC power inverter 305 also includes an inductor 310 and capacitor 312 in series with a common connection point between the switches 306 and 308 and a capacitor 328 in parallel with the low-side switch 308 loading an inverter output node. The DC-AC power inverter 305 provides power to a load represented by equivalent reflected impedance 324, which includes a load resistance $R_L$ and load reactance $X_L*1j$. A shunt capacitor 331 can be connected in parallel with the reflected impedance 324 of the load and tunable matching capacitor 326, but in some implementations, the shunt capacitor 331 is not included. The capacitor 331 produces an effect of inverting the reflected impedance 324 at the TX coil and the capacitance of the tunable matching capacitor 326 so that a total reactance of the reflected impedance 324 plus the capacitance of the tunable matching capacitor 326 that is capacitive becomes inductive for the switching stage (e.g., switches 306 and 308), and vice versa. The matching capacitor 326 is connected in series with the reflected impedance 324 of the load and has a capacitance that is controllable by the controller 304. It can be understood that the matching capacitor 326 can be any type of tunable matching network with a tunable impedance that is controllable by the controller 304. In addition, the tunable matching network can have other configurations than what is shown in FIG. 3. For example, the tunable matching network can be connected in series or in parallel with the reflected impedance 324 of the load.

In some implementations, the controller 304 is configured to improve the efficiency of the DC-AC power inverter 305 by controlling the dead-time between the switches 306 and 308, also referred to as a switching stage, and the capacitance of the matching capacitor 326. The controller 304 includes one or more microcontrollers such as microcontrollers 302 and 303 that are configured to perform the processes described herein. In some implementations, the processes performed by the microcontrollers 302 and 303 can be performed by a single microcontroller. The microcontrollers 302 and 303 can also be implemented in hardware as one or more state machines with sequential and combinational logic. The microcontroller 302 is configured to determine the reflected impedance 324 of the load based on one or more sensed parameters, which can include the supply voltage ($V_{SUP}$) 314, a peak current 316 through the switch 306 and/or 308, a junction temperature 318 of the switches 306 and/or 308, and/or a sensed current through the TX coil 344. Current variations in the peak current 316 through the switch 306 and/or 308 can be caused by changes in the load impedance or changes in the current through the TX coil 344. The microcontroller 302 uses the sensed current through the TX coil 344 to determine whether the changes in the peak current 316 are caused by load impedance changes or by changes in the current through the TX coil.

In addition, the microcontroller 302 is configured to determine whether or not to modify the dead-time between the switches 306 and 308 based on an output of a comparator 330 indicating an amount of body diode conduction of the switches 306 and 308. For example, the comparator 330 is configured to compare a voltage at a common connection point 334 between the switches 306 and 308 to a threshold voltage ($V_{THRES}$). When the voltage at the common connection point 334 is less than $V_{THRES}$, then the comparator 330 outputs a high signal. When the voltage at the common connection point 334 is greater than $V_{THRES}$, then the comparator 330 outputs a low signal. It can also be understood that the comparator 330 can also be configured to output a low signal when the voltage at the common connection point 334 is less than $V_{THRES}$ and output a high signal when the voltage at the common connection point is greater than $V_{THRES}$. The output of the comparator 330 is provided as an input to latch circuits 336 and 338, which produce outputs signals to accumulators 320 and 322. For example, output 340 from the latch circuit 336 is input to OFF accumulator 320, and output 342 from the latch circuit 338 is input to ON accumulator 322. The accumulators 320 and 322 calculate an average of the output of the comparator 330 and are used to determine how to modify the dead-time between the switches 306 and 308 based on variations in the body diode conduction of the switches 306 and 308. In some implementations, each of the accumulators 320 and 322 is associated with a dead-time between the switches 306 and 308 at a beginning or end of a clock cycle. For example, a value of the ON accumulator 322 corresponds to a dead-time between the switches 306 and 308 that occurs when the high-side switch 306 is turned off and the low-side switch 308 is turned on. A value of the OFF accumulator 320 corresponds to a dead-time between the switches 306 and 308 that occurs when the low-side switch 308 is turned off and the high-side switch 306 is turned on.

In some implementations, a value of the ON accumulator 322 is incremented when the output of the comparator 330 is high immediately before the low-side switch 308 is turned on, which means that a voltage net has been moved to the other side of the rail by an inductive load seen by the half-bridge DC-AC power inverter circuit 305 at a moment when the complementary high-side switch 306 is turned off and is in bulk conduction when the low-side switch 308 is turned on. In addition, when the output of the comparator 330 is low, the ON accumulator 322 is decreased.

Likewise, a value of the OFF accumulator 320 is incremented when the output of the comparator 330 is high immediately after the low-side switch 308 is turned off, which means that the voltage net has remained at the same side of the rail due to a capacitive loading of the half-bridge DC-AC power inverter circuit 305 until the complementary high-side switch 306 is turned on. The low-side switch 308 is in bulk conduction until the complementary high-side switch 306 turns on. In addition, when the output of the comparator 330 is low when sampling occurs, the OFF accumulator 320 is decreased.

The accumulators 320 and 322 accumulate the output of the comparator 330 over a predetermined time interval. When the dead-time between the switches 306 and 308 is within an acceptable range, the comparator 330 outputs a high signal for half of the predetermined time interval and a low signal for the other half of the predetermined time interval because a switching net voltage corresponds to $V_{THRES}$ when the clock cycles, and voltage noise causes the output of the comparator 330 to be unstable. Therefore, when the dead-time is in an acceptable range, the accumulators 320 and 322 have a value that corresponds to half of a number of clock cycles in the predetermined time interval. For example, if the value of the ON accumulator 322 is greater than half of the number of cycles in the predetermined time interval, then the dead-time between the switches 306 and 308 is too long because the switching net was low for a majority of the time when the clock for the latch circuits 336 and 338 cycled.

The microcontroller 302 can determine whether to increase or decrease the dead-time between the switches 306 and 308 based on whether the value of the ON accumulator 322 or the OFF accumulator 320 is within a predetermined range bound by an upper accumulator threshold and a lower accumulator threshold. A value of the ON accumulator 322 or the OFF accumulator 320 that is greater than the upper accumulator threshold can indicate that the dead-time between the switches 306 and 308 is too long. Having a dead-time that is too long can result in capacitive switching or inductive switching with unnecessarily long bulk current injection. When the dead-time between the switches 306 and 308 at steady-state and clamping occurs at a maximum allowable dead-time, this means that the load is inductive but not inductive enough, which causes partially capacitive switching, which causes turn-back of a voltage at the switching node 334 when both switches 306 and 308 are off. When the value of the ON accumulator 322 or the OFF accumulator 320 is greater than the upper accumulator threshold, then the microcontroller 302 can output control signals to reduce the dead-time between the switches 306 and 308. When the value of the ON accumulator 322 or the OFF accumulator 320 is less than the lower accumulator threshold indicating that the dead-time between the switches 306 and 308 is too short, then the controller 302 can output control signals to increase the dead-time. In some implementations, the microcontroller 302 is configured to determine whether or not the values of the accumulators 320 and 322 are within the predetermined range at a predetermined time interval that may be based on a reference clock period.

In some implementations, the microcontroller 302 outputs delay control signals to the microcontroller 303 based on values of the accumulators 320 and 322, and the microcontroller 303 generates gate control signals that control when the switches 306 and 308 are turned on and turned off. Details regarding operation of the microcontroller 303 are discussed further herein.

The microcontroller 302 can control the capacitance of the tunable matching capacitor 326 based on the values of the accumulators 320 and 322 as well as the dead-time between the switches 306 and 308. The microcontroller 302 modifies the capacitance of the matching capacitor 326 by issuing a control signal to driver 332, which controls the matching capacitor 326. In addition, modification of the dead-time between the switches 306 and 308 and the capacitance of matching capacitor 326 can be coordinated so that modification of the capacitance of the matching capacitor 326 is performed when the dead-time between the switches 306 and 308 has reached steady-state. In some implementations, steady-state of the dead-time is achieved when a predetermined number of cycles of a dead-time control process have been performed without having to modify the dead-time between the switches 306 and 308. Details regarding the dead-time control process are discussed further herein.

If the OFF accumulator 320 has a value that is greater than zero, then the microcontroller 302 can output a control signal to decrease the capacitance of the matching capacitor 326, which increases the total capacitive reactance of the reflected impedance 324 of the load and the matching capacitor 326. If the ON accumulator 322 has a value that is greater than zero and a length of the dead-time between the switches 306 and 308 is greater than an upper dead-time threshold of a predetermined dead-time range, then the microcontroller 302 can output a control signal to decrease the capacitance of the matching capacitor 326. If the ON accumulator 322 has a value that is greater than zero and a length of the dead-time between the switches 306 and 308 is less than a lower dead-time threshold of the predetermined dead-time range, then the microcontroller 302 can output a control signal to increase the capacitance of the matching capacitor 326. If the ON accumulator 322 and the OFF accumulator 320 both have values that are equal to zero, then the microcontroller 302 can output a control signal to decrease the capacitance of the matching capacitor 326.

Figure 4A:
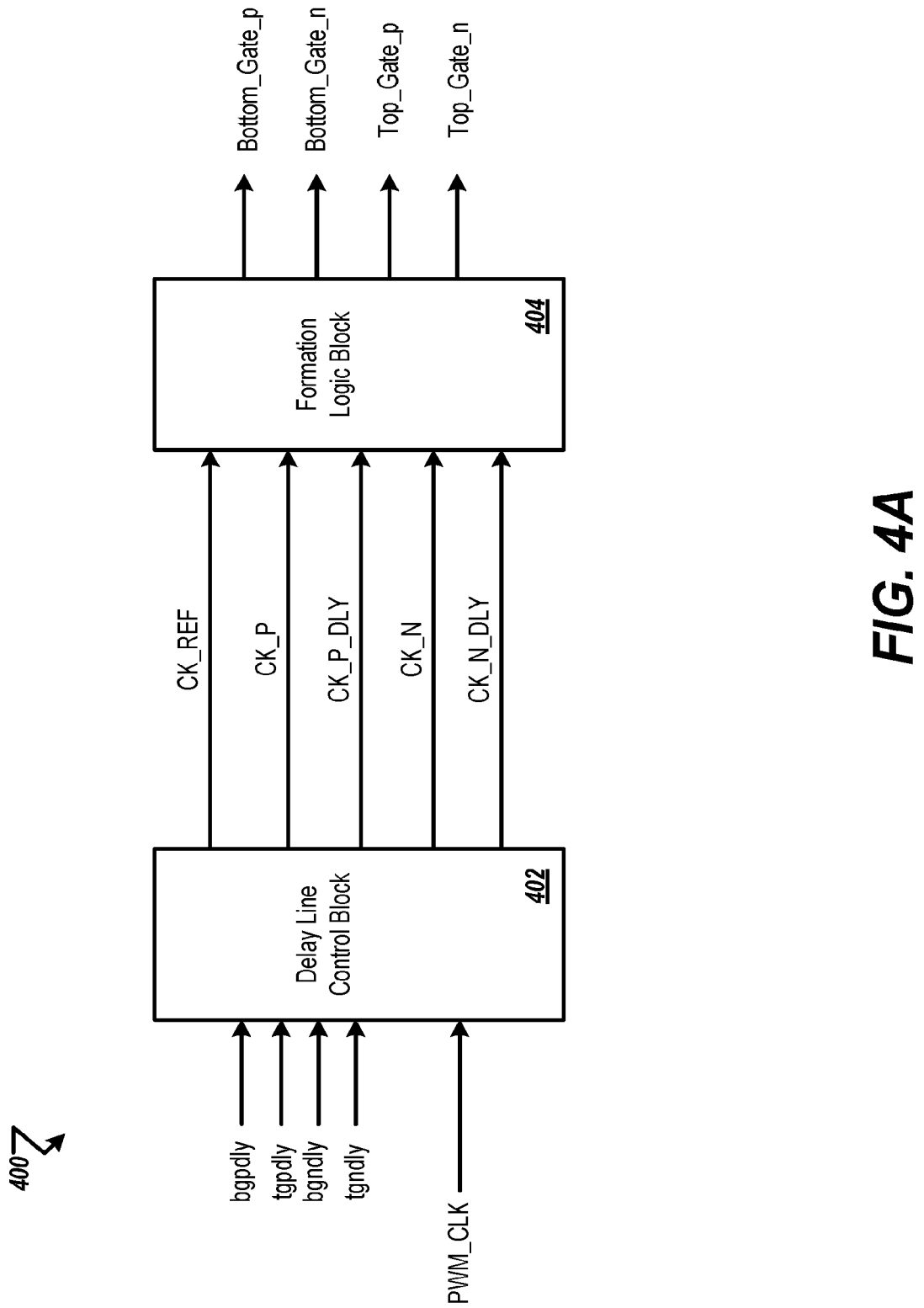
FIG. 4A is an exemplary diagram of a dead-time control circuit.
Figure 4B:
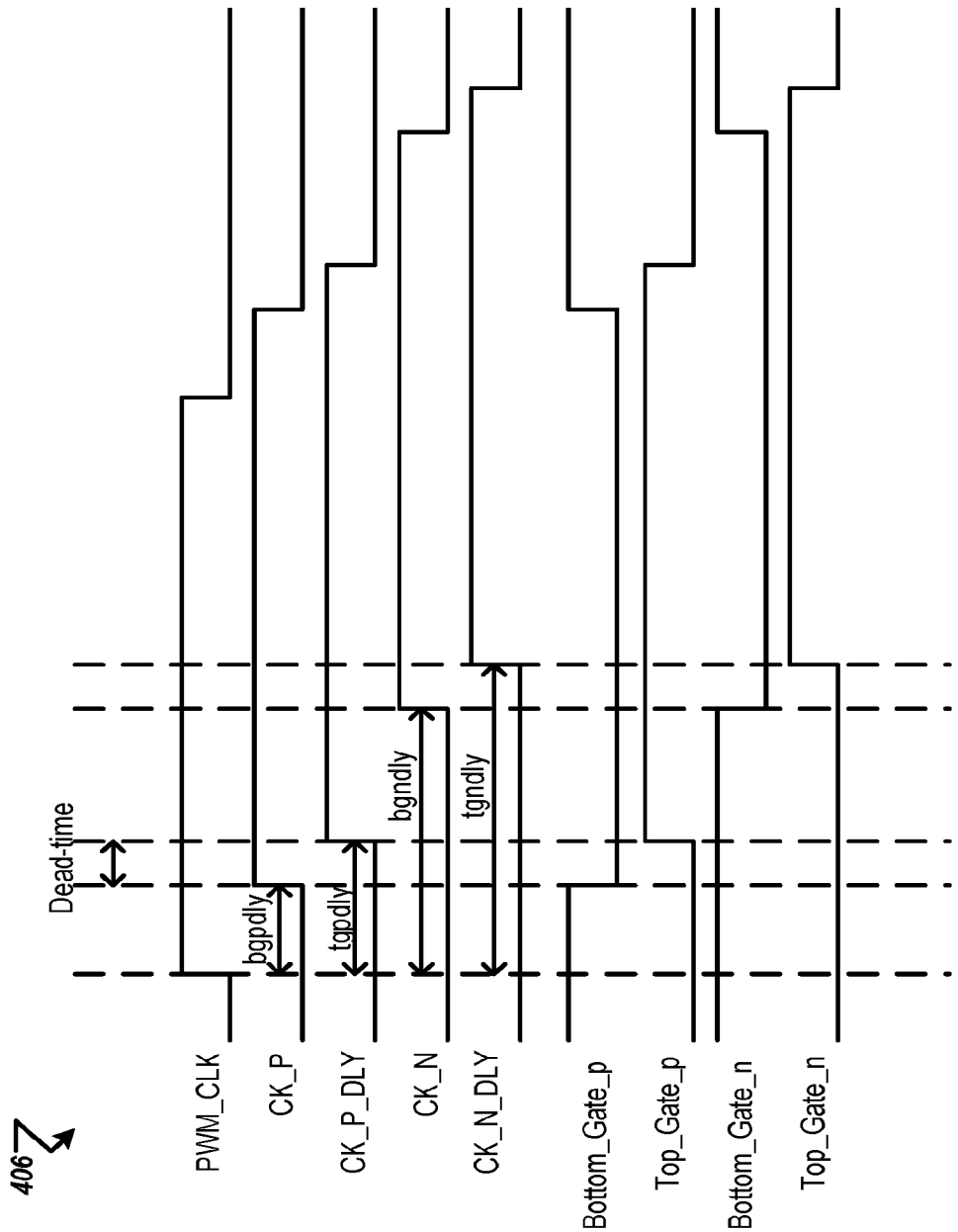
FIG. 4B is an exemplary diagram of a timing diagram for the dead-time control circuit.

FIG. 4A is an exemplary diagram of a dead-time control circuit 400 for one or more power conversion circuits, which is an implementation of the microcontroller 303 (FIG. 3), and FIG. 4B is an exemplary timing diagram 406 for signals associated with the dead-time control circuit 400. As shown in FIG. 4A, a delay line control block 402 receives a reference clock signal (PWM_CLK) along with additional delay signals from the microcontroller 302 (FIG. 3). The delay signals received from the microcontroller 302 can be associated with the switches 306 and 308 for at least one DC-AC power inversion circuit 305 or other types of power conversion circuits. For example, signal tgpdly can be associated with the high-side switch 306 and signal bgpdly can be associated with the low-side switch 308 of the DC-AC power inversion circuit 305. Similarly, signals bgndly and tgndly can be associated with the switches and of an additional DC-AC power inversion circuit. The delay signals bgpdly and tgpdly are based on the amount of dead-time between the switches 306 and 308 determined by the microcontroller 302.

At the delay line control block 402, switch control signals are generated for the switches 306 and 308 that are based on the delay signals received from the microcontroller 302. Signal CK_P is associated with the low-side switch 308, and signal CK_P_DLY is associated with the high-side switch 306. Similarly, signals CK_N and CK_N_DLY are associated with a high-side switch and a low-side switch of another DC-AC power inverter. Reference clock signal CK_REF is a reference clock signal that corresponds to the PWM_CLK signal. As shown in FIG. 4B, the switch control signal CK_P is asserted at a time that is delayed from the reference clock PWM_CLK by an amount that corresponds to the delay signal bgpdly, and the switch control signal CK_P_DLY is asserted at a time that is delayed from the reference clock PWM_CLK by an amount that corresponds to the delay signal tgpdly. A difference between the delay signals bgpdly and tgpdly corresponds to the delay time of the switches 306 and 308. Similarly, the switch control signal CK_N is asserted at a time that is delayed from the reference clock PWM_CLK by an amount that corresponds to the delay signal bgndly, and the switch control signal CK N DLY is asserted at a time that is delayed from the reference clock PWM_CLK by an amount that corresponds to the delay signal tgndly.

Referring back to FIG. 4A, at formation logic block 404, gate control signals are generated to turn the switches 306 and 308 on and off in response to receiving the switch control signals from the delay line control block 402. For example, the formation logic block 404 outputs gate control signal Top_Gate_p that controls a gate voltage of the high-side switch 306 and gate control signal Bottom_Gate_p that controls a gate voltage of the low-side switch 308. Similarly, gate control switches Top_Gate_n and Bottom_Gate_n control gate voltages of switches in another DC-AC power inverter. As shown in FIG. 4B, when the switch control signal CK_P is asserted, the formation logic block 404 de-asserts the gate control signal Bottom_Gate_p to turn off the low-side switch 308. In addition, when the switch control signal CK_P_DLY is asserted, the formation logic block 404 asserts the gate control signal Top Gate p to turn on the high-side switch 306. The amount of time between when the Bottom_Gate_p signal is de-asserted and the Top_Gate_p signal is asserted corresponds to the dead-time between the switches 306 and 308.

Figure 5:
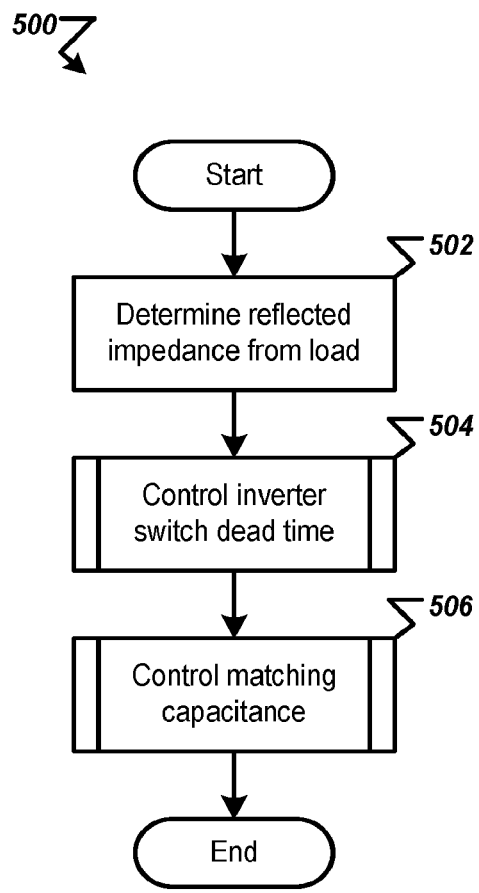
FIG. 5 is an exemplary flowchart of a power converter control process.

FIG. 5 is an exemplary flowchart of a power converter control process 500. The power converter control process 500 is described with respect to the wireless power transmitter 300 (FIG. 3) that includes the controller 304 and the DC-AC power inverter 305 but can also be applied to other controller architectures and types of power conversion circuits that operate with a switch dead-time.

At step 502, the microcontroller 302 of the controller 304 determines the reflected impedance 324 of the load based on one or more sensed parameters. The sensed parameters can include the supply voltage ($V_{SUP}$) 314, a peak current 316 through the switch 306 and/or 308, a junction temperature 318 of the switches 306 and/or 308, and/or a sensed current through the TX coil 344. The microcontroller 302 uses the sensed parameters to determine a dead-time between the switches 306 and 308 as well as a capacitance of the matching capacitor 326 that results in a DC-AC power inverter 305 operating within a predetermined efficiency range with a dead-time that is as low as possible.

At step 504, the microcontroller 302 performs a dead-time control process that determines and controls a dead-time for the switches 306 and 308 based on the reflected impedance of the load 324. In some implementations, the microcontroller 302 determines a dead-time that is as low as possible for both inductive and capacitive switching in order to reduce dead-time losses, improve reliability, and reduce substrate currents. Details regarding the dead-time control process are discussed further herein.

At step 506, the microcontroller 302 performs a matching capacitance control process that determines and controls the capacitance of the matching capacitor 326 based on the reflected load impedance and the dead-time between the switches 306 and 308 determined at step 504. The microcontroller 302 determines whether to increase or decrease the capacitance of the matching capacitor 326 in order to reduce losses so the DC-AC power inverter can operate within the predetermined efficiency range. Details regarding the matching capacitance control process are discussed further herein.

Figure 6:
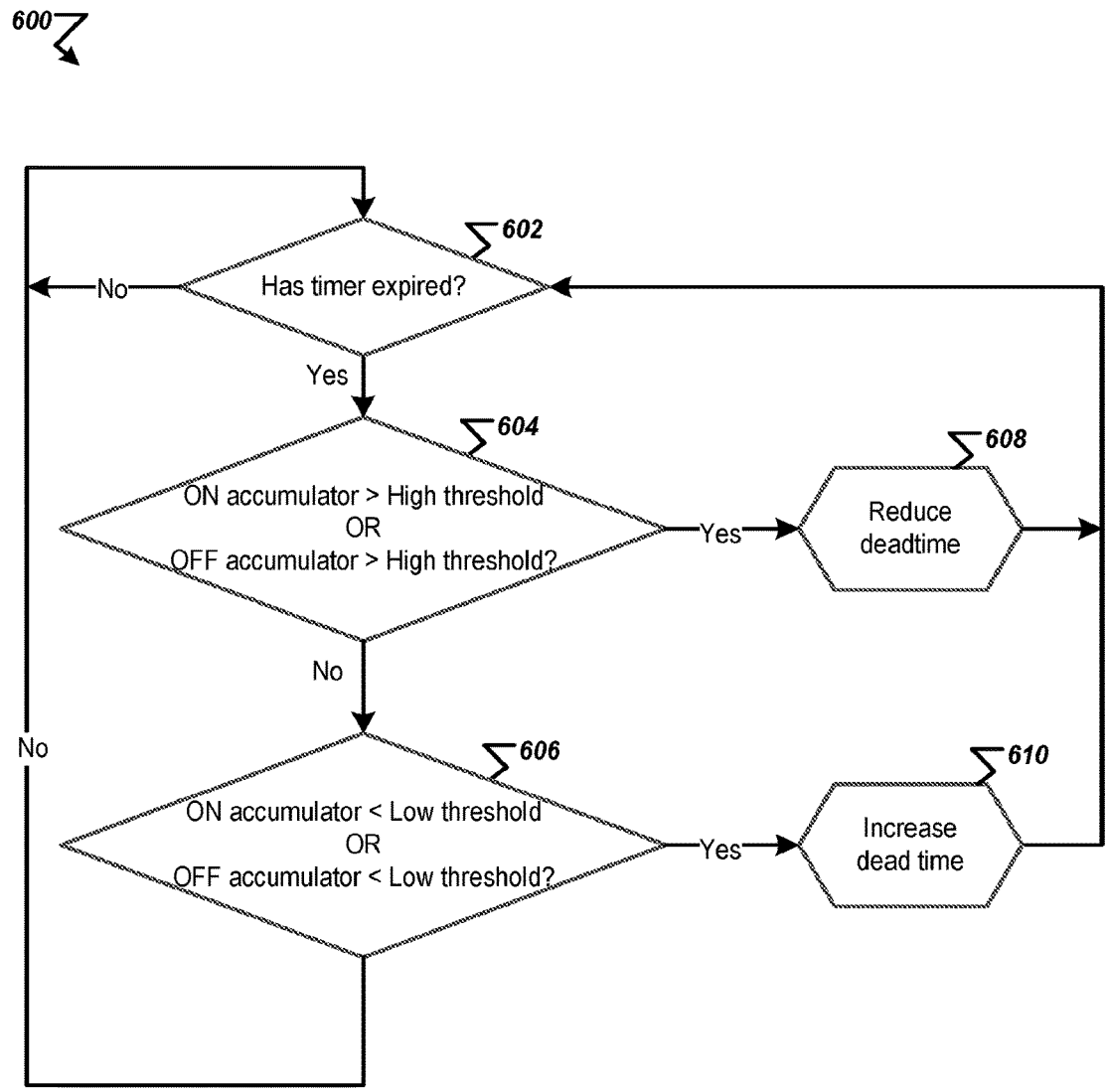
FIG. 6 is an exemplary flowchart of a dead-time control process.

FIG. 6 is an exemplary flowchart of a dead-time control process 600, which is an implementation of step 504 of the power converter control process 500. The microcontroller 302 is configured to determine whether or not to modify the dead-time between the switches 306 and 308 based on an output of a comparator 330 indicating an amount of body diode conduction of the switches 306 and 308. The output of the comparator 330 is provided as an input to latch circuits 336 and 338, which produce outputs signals to accumulators 320 and 322. For example, output 340 from the latch circuit 336 is input to OFF accumulator 320, and output 342 from the latch circuit 338 is input to ON accumulator 322. The accumulators 320 and 322 calculate an average of the output of the comparator 330 and are used to determine how to modify the dead-time between the switches 306 and 308 based on variations in the body diode conduction of the switches 306 and 308. For example, the microcontroller 302 can determine whether to increase or decrease the dead-time between the switches 306 and 308 based on whether the value of the ON accumulator 322 or the OFF accumulator 320 is within a predetermined range bound by an upper accumulator threshold and a lower accumulator threshold.

At step 602, the microcontroller 302 determines whether or not a timer has expired. The timer tracks a predetermined time interval that corresponds to a frequency with which the microcontroller 302 determines whether or not to modify the dead-time between the switches 306 and 308, which may be based on a reference clock period for the gate control signals. If the timer has expired, resulting in a "yes" at step 602, then step 604 is performed. Otherwise, if the timer has not expired, resulting in a "no" at step 602, then the process returns to step 602.

At step 604, the microcontroller 302 determines whether or a value of the ON accumulator 322 or the OFF accumulator 320 is greater than the upper accumulator threshold. A value of the ON accumulator 322 or the OFF accumulator 320 that is greater than the upper accumulator threshold can indicate that the dead-time between the switches 306 and 308 is too long. Having a dead-time that is too long can result in capacitive switching or inductive switching with unnecessarily long bulk current injection. If the value of the ON accumulator 322 or the OFF accumulator 320 is greater than the upper accumulator threshold, resulting in a "yes" at step 604, then step 608 is performed. Otherwise, if the value of the value of the ON accumulator 322 or the OFF accumulator 320 is not greater than the upper accumulator threshold, resulting in a "no" at step 604, then step 606 is performed.

At step 608, the microcontroller 302 outputs control signals to reduce the dead-time between the switches 306 and 308. For example, the microcontroller 302 modifies the delay signals tgpdly and hgpoly that are output to the microcontroller 303 to reduce the dead-time, which are used to generate the gate control signals for the switches 306 and 308.

At step 606, the microcontroller 302 determines whether the value of the ON accumulator 322 or the OFF accumulator 320 is less than the lower accumulator threshold indicating that the dead-time between the switches 306 and 308 is too short. If the value of the ON accumulator 322 or the OFF accumulator 320 is less than the lower accumulator threshold, resulting in a "yes" at step 606, then step 610 is performed. Otherwise, if the value of the value of the ON accumulator 322 or the OFF accumulator 320 is not less than the lower accumulator threshold, resulting in a "no" at step 606, then the process returns to step 602.

At step 610, the microcontroller 302 outputs control signals to increase the dead-time between the switches 306 and 308. For example, the microcontroller 302 modifies the delay signals tgpdly and bgpdly that are output to the microcontroller 303 to increase the dead-time, which are used to generate the gate control signals for the switches 306 and 308.

Figure 7:
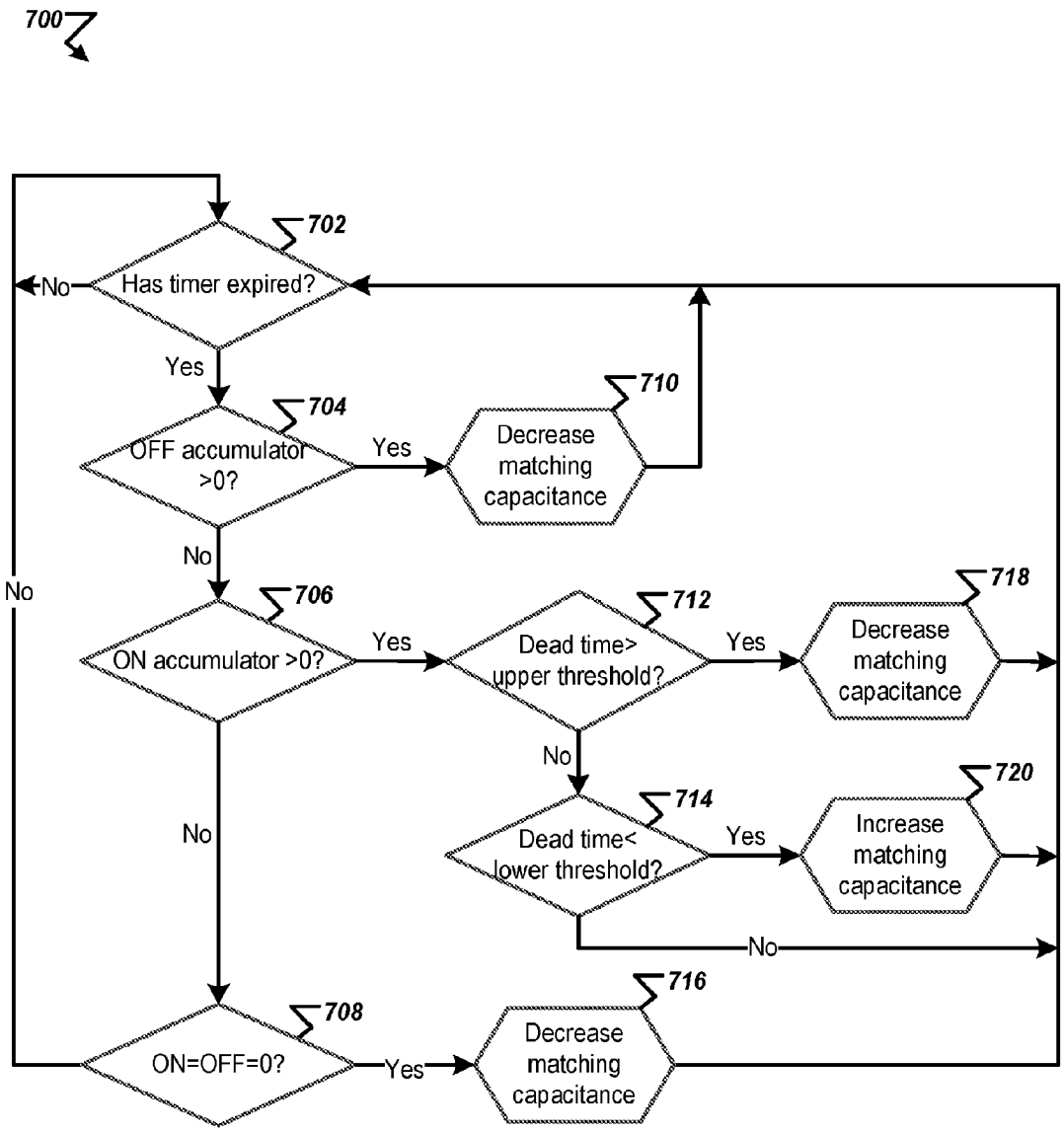
FIG. 7 is an exemplary flowchart of a matching capacitance control process.

FIG. 7 is an exemplary flowchart of a matching capacitance control process 700, which is an implementation of step 506 of the power converter control process 500. The microcontroller 302 determines whether to increase or decrease the capacitance of the matching capacitor 326 based on the reflected impedance 324 of the load and the steady-state dead-time between the switches 306 and 308 in order to reduce losses so the DC-AC power inverter can operate within the predetermined efficiency range.

At step 702, the microcontroller 302 determines whether or not a timer has expired. The timer tracks a predetermined time interval that corresponds to a frequency with which the microcontroller 302 determines whether or not to modify the capacitance of the matching capacitor 326. The timer associated with the matching capacitance control process 700 can be the same timer that is associated with the dead-time control process 600. In other implementations, the timer associated with the matching capacitance control process 700 is offset from the timer associated with the dead-time control process 600 so that the capacitance of the matching capacitor 326 is determined after the dead-time for the switches 306 and 308 is determined. If the timer has expired, resulting in a "yes" at step 702, then step 704 is performed. Otherwise, if the timer has not expired, resulting in a "no" at step 702, then the process returns to step 702.

At step 704, the microcontroller 302 determines whether the OFF accumulator 320 has a value that is greater than zero. If the OFF accumulator 320 has a value that is greater than zero, resulting in a "yes" at step 704, then step 710 is performed. Otherwise, if the OFF accumulator does not have a value that is greater than zero, resulting in a "no" at step 704, then step 706 is performed.

At step 710, the microcontroller outputs a control signal to decrease the capacitance of the matching capacitor 326 via the driver 332, which increases the total capacitive reactance of the reflected impedance 324 of the load and the matching capacitor 326, resulting in a more inductive load of the switching stage (e.g., switches 306 and 308).

At step 706, the microcontroller 302 determines whether the ON accumulator 322 has a value that is greater than zero. If the ON accumulator 322 has a value that is greater than zero, resulting in a "yes" at step 706, then step 712 is performed. Otherwise, if the OFF accumulator does not have a value that is greater than zero, resulting in a "no" at step 704, then step 708 is performed.

At step 706, the microcontroller 302 determines whether the dead-time between the switches 306 and 308 is greater than an upper dead-time threshold of a predetermined dead-time range. If the dead-time between the switches 306 and 308 is greater than the upper dead-time threshold, resulting in a "yes" at step 712, then step 718 is performed. Otherwise, if the dead-time between the switches 306 and 308 is not greater than the upper dead-time threshold, resulting in a "no" at step 712, then step 714 is performed.

At step 718, the microcontroller outputs a control signal to decrease the capacitance of the matching capacitor 326 via the driver 332, which increases the total inductance of the reflected impedance 324 of the load and the matching capacitor 326.

At step 714, the microcontroller 302 determines whether the dead-time between the switches 306 and 308 is less than a lower dead-time threshold of the predetermined dead-time range. If the dead-time between the switches 306 and 308 is less than the lower dead-time threshold, resulting in a "yes" at step 714, then step 720 is performed. Otherwise, if the dead-time between the switches 306 and 308 is not less than the lower dead-time threshold, resulting in a "no" at step 714, then the process returns to step 702.

At step 720, the microcontroller outputs a control signal to increase the capacitance of the matching capacitor 326 via the driver 332, which reduces the total inductance of the reflected impedance 324 of the load and the matching capacitor 326.

At step 708, the microcontroller 302 determines whether the ON accumulator 322 and the OFF accumulator 320 both have values that are equal to zero. If the ON accumulator 322 and the OFF accumulator 320 both have values that are equal to zero, resulting in a "yes" at step 708, then step 716 is performed. Otherwise, if the ON accumulator 322 and the OFF accumulator 320 do not both have values that are equal to zero, resulting in a "no" at step 708, then the process returns to step 702.

At step 716, the microcontroller outputs a control signal to decrease the capacitance of the matching capacitor 326 via the driver 332, which increases the total capacitive reactance of the reflected impedance 324 of the load and the matching capacitor 326, resulting in a more inductive load of the switching stage (e.g., switches 306 and 308).

Figure 8B:
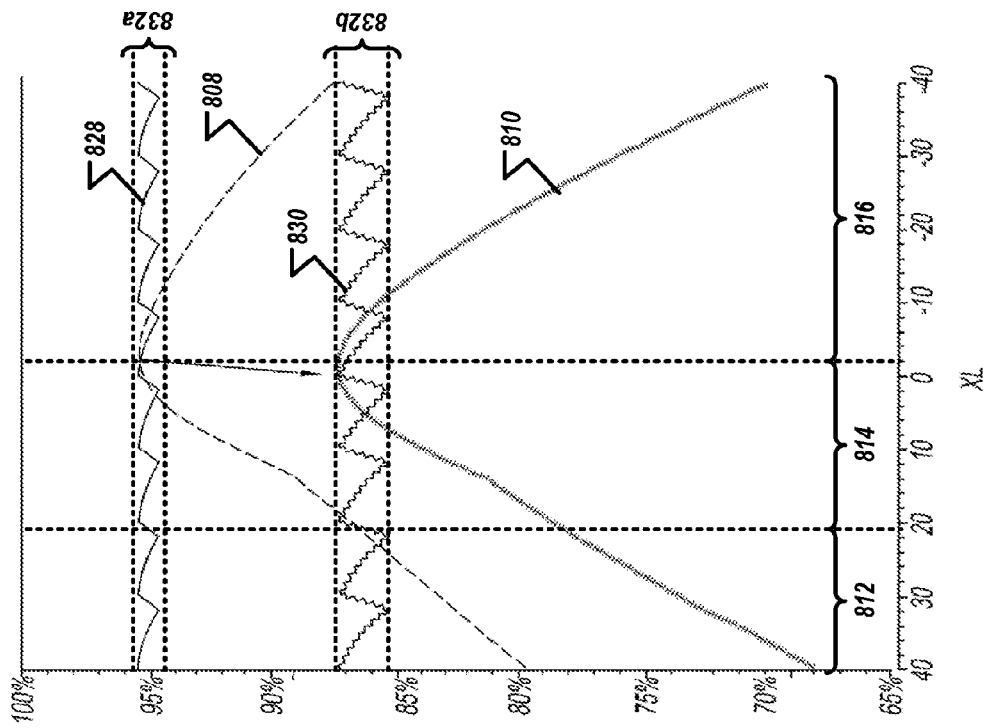
FIG. 8B illustrates exemplary graphs of efficiency with respect to load reactance for a power converter.
Figure 8A:
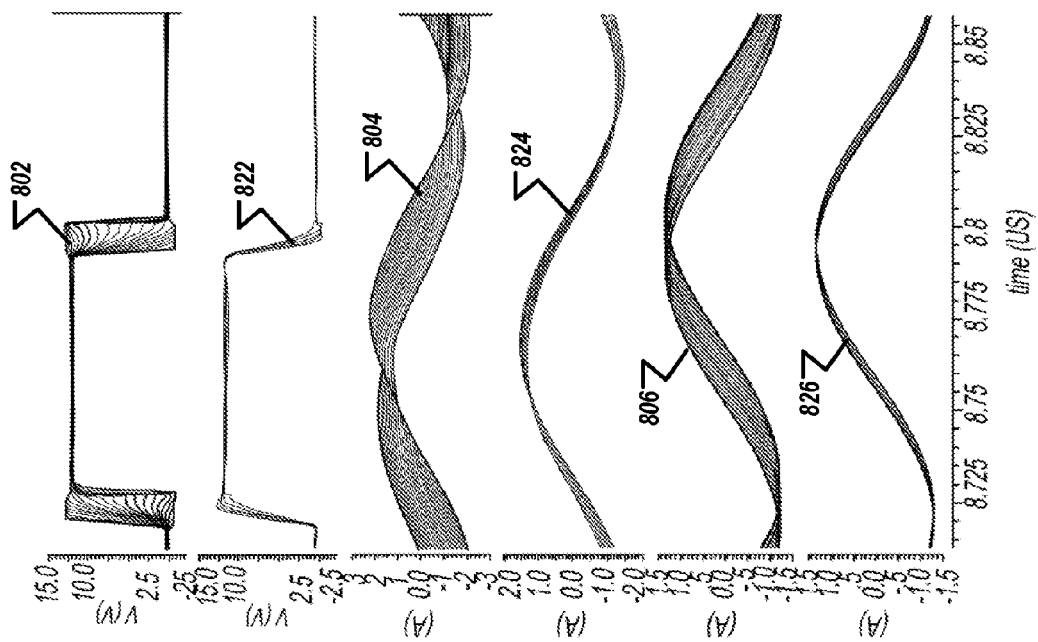
FIG. 8A illustrates exemplary graphs of voltage and current waveforms in a power converter.

FIGS. 8A and 8B include exemplary graphs illustrating operation of the wireless power transmitter 300 (FIG. 3). The graphs of FIG. 8A include waveforms 802, 804, and 806, which correspond to the waveforms 202, 204, and 206 from FIG. 2A that do not include the dead-time and matching capacitor control processes described previously herein. Waveforms 822, 824, and 826 represent corresponding waveforms that implement the dead-time and matching capacitor control processes implemented by the controller 304. For example, waveform 822 represents a half-bridge output voltage for the DC-AC power inverter 305, waveform 824 represents a current through the inductor 310, and waveform 826 represents a current through a TX coil, which is represented by the reflected impedance 324.

The graph of FIG. 8B include efficiency curves 808 and 810 that correspond to the efficiency curves 208 and 210 from FIG. 2B. The graph of FIG. 8B also include efficiency curves for the wireless power transmitter 300 that implement the dead-time and matching capacitor control processes. For example, curve 828 represents a circuit efficiency that is based on no inductor losses, and curve 830 represents a circuit efficiency that takes into account effects of inductor losses of the inductor 310. In addition, regions 812, 814, and 816 correspond to the regions 212, 214, and 216 described previously with respect to FIG. 2B. The curves 828 and 830 show an improved efficiency in the operation of the DC-AC power inverter 305 that has a controlled dead-time and a controlled capacitance of the matching capacitor 326 over a wide range of reflected impedances. Each saw tooth period in the efficiency curves 828 and 830 represents variation in the dead-time between the switches 306 and 308 within the predetermined dead-time range with an increase in the capacitance of the matching capacitor 326 moving from left to right across the graph. The graph of FIG. 8B also shows that implementing the dead-time and matching capacitance control provides for maintaining the efficiency of the DC-AC power inverter 305 within predetermined operational efficiency range 832a,b.

The implementations described herein are directed to improving efficiency of a DC-AC power inverter by performing load matching through controlling the capacitance of a matching capacitor in series with a reflected load impedance and controlling the dead-time between the switches of the DC-AC power inverter. The controller of the DC-AC power inverter is able to perform the dead-time control and matching capacitance control without any additional current sensing at the TX coil of the wireless power transmitter or RX coil of the wireless power receiver. The implementations described herein allow the dead-time between the switches to be reduced while also reducing power losses. Currents in the substrate are reduced along with a significant reduction in the noise in the substrate that affects other substrate noise sensitive circuits, which allows an isolation ring area to be reduced. The controller also reduces currents flowing through external components thereby improving their reliability and improving efficiency at a system level. The controller also causes a decrease in a total cost of DC-AC inverter applications by removing a dependence on external fans or special heat sinkers since power losses can be reduced.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Additionally, an implementation may be performed on modules or hardware not identical to those described. Accordingly, other implementations are within the scope that may be claimed.

The invention claimed is:

1. A device comprising:
   circuitry configured to
      determine a load impedance for at least one power conversion device,
      control a dead-time of one or more switching stages of the at least one power conversion device based on the load impedance,
      control a tunable matching network based on the load impedance and the dead-time of the one or more switching stages, and
      modify the dead-time of the one or more switching stages including a plurality of switches based on a comparator output indicating an amount of body diode conduction of the plurality of switches.

2. The device of claim 1, wherein the circuitry is further configured to determine the load impedance based on at least one of a supply voltage for the one or more switching stages, a peak current through the one or more switching stages, a current at a transmitter coil, or a junction temperature of the one or more switching stages.

3. The device of claim 1, wherein the power conversion device is a half-bridge DC-AC power inverter.

4. The device of claim 1, wherein the tunable matching network is in series or in parallel with the load.

5. The device of claim 1, wherein the circuitry is further configured to determine an impedance of the tunable matching network resulting in a total impedance of the load impedance and the impedance of the tunable matching network that corresponds to a predetermined operational efficiency range of the power conversion device.

6. The device of claim 1, wherein a total impedance of the one or more switching stages is inductive.

7. The device of claim 1, wherein the one or more switching stages include a first switch and a second switch, and the circuitry is configured to modify the dead-time based on a comparator output indicating an amount of body diode conduction of the first switch and the second switch.

8. The device of claim 7, wherein the comparator is configured to compare a voltage at a common connection point between the first switch and the second switch to a threshold voltage, wherein the comparator is configured to
   output a first signal in response to determining that the voltage at the common connection point is less than the threshold voltage; and
   output a second signal in response to determining that the voltage at the common connection point is greater than the threshold voltage.

9. The device of claim 7, wherein the circuitry further includes a first digital accumulator and a second digital accumulator configured to calculate an average of the comparator output based on outputs from one or more latch circuits.

10. The device of claim 9, wherein the first digital accumulator is configured to detect first variations in the amount of body diode conduction in a case that the first switch is turned off and the second switch is turned on; and
   the second digital accumulator is configured to detect second variations in the amount of body diode conduction in a case that the first switch is turned on and the second switch is turned off.

11. The device of claim 9, wherein the circuitry is further configured to reduce the dead-time between the first switch and the second switch in response to determining that a first value of the first digital accumulator or a second value of the second digital accumulator is greater than a first accumulator threshold.

12. The device of claim 11, wherein the circuitry is further configured to increase the dead-time between the first switch and the second switch in response to determining that the first value of the first digital accumulator or the second value of the second digital accumulator is less than a second accumulator threshold that is less than the first accumulator threshold.

13. The device of claim 9, wherein the circuitry is further configured to modify an impedance of the tunable matching network in response to determining that a second value of the second digital accumulator is greater than zero resulting in a reactance of a switching stage load becoming more inductive.

14. The device of claim 9, wherein the circuitry is further configured to modify an impedance of the tunable matching network in response to determining that a first value of the first digital accumulator and a second value of the second digital accumulator are equal to zero resulting in a reactance of a switching stage load becoming more inductive.

15. The device of claim 9, wherein the circuitry is further configured to control the dead-time between the first switch and the second switch within a predetermined dead-time range having an upper dead-time threshold and a lower dead-time threshold.

16. The device of claim 15, wherein the circuitry is further configured to modify an impedance of the tunable matching network in response to determining that a first value of a first accumulator is greater than zero and the dead-time between the first switch and the second switch is greater than or equal to the upper dead-time threshold.

17. The device of claim 16, wherein the circuitry is further configured to modify an impedance of the tunable matching network in response to determining that a first value of a first accumulator is greater than zero and the dead-time between the first switch and the second switch is less than or equal to the lower dead-time threshold.

18. The device of claim 1, wherein the circuitry is further configured to control the dead-time of the one or more switching stages by modifying one or more delay signals corresponding to control signals for the one or more switching stages.

19. A method comprising:
   determining a reflected impedance from a receiver coil at a coil of a wireless power transmitter;
   controlling a dead-time of one or more switching stages of at least one power conversion device of the wireless power transmitter based on the reflected impedance;
   controlling an impedance of a tunable matching network based on the reflected impedance and the dead-time of the one or more switching stages; and
   modifying the dead-time of the one or more switching stages including a plurality of switches based on a comparator output indicating an amount of body diode conduction of the plurality of switches.

20. A wireless power transmitter comprising:
   circuitry configured to
      determine a reflected impedance from a receiver coil at a transmitter coil,
      control a dead-time of one or more switching stages of a power conversion device based on the reflected impedance,
      control a tunable impedance of a matching network at the transmitter based on the reflected impedance and the dead-time of the one or more switching stages, and
      modify the dead-time of the one or more switching stages including a plurality of switches based on a comparator output indicating an amount of body diode conduction of the plurality of switches.

* * * * *